(12) United States Patent
Kong

(10) Patent No.: US 9,814,047 B2
(45) Date of Patent: Nov. 7, 2017

(54) MULTIBAND SIGNAL PROCESSING APPARATUS AND METHOD

(71) Applicant: Huawei Technologies Co., Ltd., Shenzhen, Guangdong (CN)

(72) Inventor: Xiangming Kong, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/429,658

(22) Filed: Feb. 10, 2017

(65) Prior Publication Data

US 2017/0156150 A1 Jun. 1, 2017

Related U.S. Application Data

(63) Continuation of application No. PCT/CN2014/084079, filed on Aug. 11, 2014.

(51) Int. Cl.
| | |
|---|---|
| H04B 1/26 | (2006.01) |
| H04W 72/04 | (2009.01) |
| H04W 52/02 | (2009.01) |
| H04L 12/26 | (2006.01) |

(52) U.S. Cl.
CPC ........ H04W 72/0453 (2013.01); H04L 43/16 (2013.01); H04W 52/0203 (2013.01)

(58) Field of Classification Search
None
See application file for complete search history.

(56) References Cited

U.S. PATENT DOCUMENTS

| | | | |
|---|---|---|---|
| 6,185,248 B1 | 2/2001 | Wiegand | |
| 8,841,923 B1* | 9/2014 | Vanwiggeren | G01R 19/0053 324/606 |
| 2007/0081613 A1* | 4/2007 | Kim | H04B 1/71635 375/327 |
| 2009/0061812 A1* | 3/2009 | VanWiggeren | G01R 19/0053 455/326 |
| 2009/0216468 A1* | 8/2009 | Anderson | G01R 23/165 455/323 |
| 2013/0230131 A1* | 9/2013 | Moore | H04B 1/0032 375/350 |
| 2017/0111127 A1* | 4/2017 | Vanwiggeren | H04B 17/15 455/313 |

* cited by examiner

Primary Examiner — Lana N Le (57) ABSTRACT

The present invention discloses a multiband signal processing apparatus and method. The apparatus includes a multi-tone local oscillator signal generating unit and a multi-tone local oscillator signal transmission channel, where the multi-tone local oscillator signal transmission channel includes a band-pass filter and a frequency mixer. The multi-tone local oscillator signal generating unit is configured to generate a multi-tone local oscillator signal according to frequency response information of at least one device included in the multi-tone local oscillator signal transmission channel; the band-pass filter is configured to filter the received multi-tone local oscillator signal to obtain a filtered multi-tone local oscillator signal; and the frequency mixer is configured to perform frequency mixing on the multiband signal and the received multi-tone local oscillator signal.

11 Claims, 6 Drawing Sheets

FIG. 1

Typical multi-tone local oscillator signal in the prior art

MULTIBAND SIGNAL PROCESSING APPARATUS AND METHOD

CROSS-REFERENCE TO RELATED APPLICATIONS

This application is a continuation of International Application No. PCT/CN2014/084079, filed on Aug. 11, 2014, the disclosure of which is hereby incorporated by reference in its entirety.

TECHNICAL FIELD

Embodiments of the present invention relate to the communications field, and more specifically, to a multiband signal processing apparatus and method.

BACKGROUND

With the development of communications technologies, a data transmission rate becomes increasingly high. Correspondingly, bandwidth required for data transmission also becomes increasingly high. However, in a current frequency spectrum distribution condition, it is extremely hard to directly obtain a relatively wide contiguous frequency spectrum. Therefore, it is an inevitable communications development trend to aggregate multiple frequency spectrum fragments for data transmission. In a current Long Term Evolution (Long Term Evolution, LTE) standard, a requirement for supporting double-carrier aggregation is proposed, and a possibility of five-carrier aggregation is defined. Because aggregated carriers may cross a relatively wide frequency band, it is extremely hard to get all carriers together as a single frequency band for processing. If signals carried on all the carriers are separately moved to a baseband to perform sampling and demodulation, each carrier needs a radio frequency channel. With an increase in a quantity of aggregated carriers, a quantity of radio frequency channels also increases accordingly, which causes corresponding increases in circuit complexity and power consumption.

To resolve the foregoing technical problem, in the prior art, frequency mixing is performed on a periodic sequence (also referred to as a multi-tone local oscillator signal, multi-tone local oscillator signal) having a comb frequency spectrum and a multiband signal including multiple scattered narrowband signals, so that aliasing of all the scattered narrowband signals included in the multiband signal is performed on the baseband, and sampling points of all the narrowband signals are separated according to an algorithm. By using the foregoing technical solution, the multiband signal may be processed by using one or several radio frequency channels, which significantly reduces the circuit complexity and the power consumption.

In the existing various multi-tone local oscillator signal generating methods, a method for generating a multi-tone local oscillator signal by using a compressed sensing technology has an obvious advantage. However, a multi-tone local oscillator signal generated by using the compressed sensing technology has a harmonic in all multiplied frequencies of a fundamental frequency, that is, besides that a harmonic exists in a sub-band in which the multiband signal is located, a harmonic also exists in another sub-band that has no wanted signal. However, in a process of performing frequency mixing, signals in all sub-bands are moved to the baseband for aliasing. In this way, the multi-tone local oscillator signal moves noise and an interfering signal that are in the other sub-band to the baseband as well as moving all the narrowband signals in the multiband signal to the baseband. Aliasing of the wanted signal and the noise and the interfering signal enables a baseband signal obtained by frequency mixing to have a relatively low signal-to-noise ratio.

SUMMARY

Embodiments of the present invention provide a multiband signal processing apparatus and method, so as to improve a signal-to-noise ratio of a baseband signal.

According to a first aspect, an embodiment of the present invention provides a multiband signal processing apparatus, including a multi-tone local oscillator signal generating unit and a multi-tone local oscillator signal transmission channel. The multi-tone local oscillator signal transmission channel includes a band-pass filter and a frequency mixer, where the multi-tone local oscillator signal generating unit is configured to generate a multi-tone local oscillator signal according to frequency response information of at least one device included in the multi-tone local oscillator signal transmission channel, and transmit the multi-tone local oscillator signal to the band-pass filter in the multi-tone local oscillator signal transmission channel. The band-pass filter is configured to filter the received multi-tone local oscillator signal that is generated by the multi-tone local oscillator signal generating unit, to obtain a filtered multi-tone local oscillator signal; and transmit the filtered multi-tone local oscillator signal to the frequency mixer. The frequency mixer is configured to perform frequency mixing on the multiband signal and the received multi-tone local oscillator signal that is filtered by the band-pass filter, where in a location in which a non-zero spectral component of the multiband signal is located, the filtered multi-tone local oscillator signal has a non-zero spectral component, and in at least one multiplied frequency of multiple contiguous multiplied frequencies of a fundamental frequency, the filtered multi-tone local oscillator signal has no non-zero spectral component.

In a first possible implementation manner, the multi-tone local oscillator signal received by the frequency mixer has no non-zero spectral component in a first location, where distances between the first location and locations in which all non-zero spectral components of the multiband signal are located are all greater than a first threshold.

With reference to the foregoing possible implementation manner, in a second possible implementation manner, the multi-tone local oscillator signal generating unit is specifically configured to generate the multi-tone local oscillator signal according to the frequency response information of the at least one device included in the multi-tone local oscillator signal transmission channel, so that the multi-tone local oscillator signal received by the frequency mixer has multiple non-zero spectral components and the multiple non-zero spectral components meet at least one of the following conditions: phases of the multiple non-zero spectral components are irrelevant, or a signal amplitude difference between any two spectral components of the multiple non-zero spectral components does not exceed a second threshold.

With reference to the foregoing possible implementation manners, in a third possible implementation manner, the band-pass filter is a tunable band-pass filter.

With reference to the foregoing possible implementation manners, in a fourth possible implementation manner, the multi-tone local oscillator signal transmission channel further includes a memory and an analog-to-digital conversion unit, where the multi-tone local oscillator signal generating unit is specifically configured to transmit the generated multi-tone local oscillator signal to the memory in the multi-tone local oscillator signal transmission channel; the memory is configured to store, in a digital form, the multi-tone local oscillator signal generated by the multi-tone local oscillator signal generating unit; the analog-to-digital conversion unit is configured to obtain the multi-tone local oscillator signal stored in the memory, convert the obtained multi-tone local oscillator signal in the digital form into a local oscillator signal in an analog form, and transmit the multi-tone local oscillator signal in the analog form to the band-pass filter; and the band-pass filter is specifically configured to filter the received multi-tone local oscillator signal in the analog form to obtain a filtered multi-tone local oscillator signal.

With reference to the foregoing possible implementation manners, in a fifth possible implementation manner, the multi-tone local oscillator signal transmission channel further includes an equalizer. The band-pass filter is specifically configured to transmit the filtered multi-tone local oscillator signal to the equalizer; the equalizer is configured to adjust, according to a preset adjustment criterion, a signal amplitude of the received multi-tone local oscillator signal that is filtered by the band-pass filter, to obtain a multi-tone local oscillator signal whose signal amplitude is adjusted; and transmit the multi-tone local oscillator signal whose signal amplitude is adjusted to the frequency mixer. The frequency mixer is specifically configured to perform frequency mixing on the multiband signal and the received multi-tone local oscillator signal whose signal amplitude is adjusted.

According to a second aspect, an embodiment of the present invention provides a multiband signal processing method, where the method is executed by a multiband signal processing apparatus, the multiband signal processing apparatus includes a multi-tone local oscillator transmission channel, and the method includes: determining a multi-tone local oscillator signal, where the multi-tone local oscillator signal is generated according to frequency response information of at least one device included in the multi-tone local oscillator signal transmission channel; filtering the multi-tone local oscillator signal according to a preset pass band condition to obtain a filtered multi-tone local oscillator signal; and performing frequency mixing on the multiband signal and the filtered multi-tone local oscillator signal, where in a location in which a non-zero spectral component of the multiband signal is located, the filtered multi-tone local oscillator signal has a non-zero spectral component, and in at least one multiplied frequency of multiple contiguous multiplied frequencies of a fundamental frequency, the filtered multi-tone local oscillator signal has no non-zero spectral component.

In a first possible implementation manner, the filtered multi-tone local oscillator signal has no non-zero spectral component in a first location, where distances between the first location and locations in which all non-zero spectral components of the multiband signal are located are all greater than a first threshold.

With reference to the foregoing possible implementation manner, in a second possible implementation manner, the filtered multi-tone local oscillator signal has multiple non-zero spectral components, where the multiple non-zero spectral components meet at least one of the following conditions: phases of the multiple non-zero spectral components are irrelevant, or a signal amplitude difference between any two spectral components of the multiple non-zero spectral components does not exceed a second threshold.

With reference to the foregoing possible implementation manners, in a third possible implementation manner, the determining a multi-tone local oscillator signal includes: obtaining a multi-tone local oscillator signal stored in a memory; before the filtering the multi-tone local oscillator signal according to a preset pass band condition to obtain a filtered multi-tone local oscillator signal, the method further includes: converting the obtained multi-tone local oscillator signal from a digital form into an analog form; and the filtering the multi-tone local oscillator signal in the analog form according to a preset pass band condition to obtain a filtered multi-tone local oscillator signal includes: filtering the multi-tone local oscillator signal in the analog form according to the preset pass band condition to obtain the filtered multi-tone local oscillator signal.

With reference to the foregoing possible implementation manners, in a fourth possible implementation manner, the determining a multi-tone local oscillator signal includes: generating the multi-tone local oscillator signal according to the frequency response information of the at least one device included in the multi-tone local oscillator signal transmission channel.

With reference to the foregoing possible implementation manners, in a fifth possible implementation manner, before the performing frequency mixing on the multiband signal and the filtered multi-tone local oscillator signal, the method further includes: adjusting, according to a preset adjustment criterion, a signal amplitude of the filtered multi-tone local oscillator signal to obtain a multi-tone local oscillator signal whose signal amplitude is adjusted; and the performing frequency mixing on the multiband signal and the filtered multi-tone local oscillator signal includes: performing frequency mixing on the multiband signal and the multi-tone local oscillator signal whose signal amplitude is adjusted.

Based on the foregoing technical solutions, according to the multiband signal processing apparatus and method provided in the embodiments of the present invention, a multi-tone local oscillator signal generating unit generates a multi-tone local oscillator signal according to frequency response information of at least one device included in a multi-tone local oscillator signal transmission channel, and transmits the generated multi-tone local oscillator signal to the multi-tone local oscillator signal transmission channel. A band-pass filter in the multi-tone local oscillator signal transmission channel filters the multi-tone local oscillator signal received by the band-pass filter according to a preset filtering pass band, and transmits a filtered multi-tone local oscillator signal to a frequency mixer in the multi-tone local oscillator signal transmission channel. The frequency mixer performs frequency mixing on a to-be-processed multiband signal and the received multi-tone local oscillator signal that is filtered by the band-pass filter, so as to obtain a baseband signal, where in at least one multiplied frequency of multiple contiguous multiplied frequencies of a fundamental frequency, the multi-tone local oscillator signal received by the frequency mixer has no non-zero spectral component, which can avoid, in a process of frequency mixing, performing aliasing of too much noise and the multiband signal on a baseband so as to improve a signal-to-noise ratio of the baseband signal.

BRIEF DESCRIPTION OF THE DRAWINGS

To describe the technical solutions in the embodiments of the present invention more clearly, the following briefly describes the accompanying drawings required for describing the embodiments of the present invention or the prior art.

Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Te lit Evolution (Long Term Evolution, LTE) system, an LTE frequency division duplex (Frequency Division Duplex, FDD) system, an LTE time division duplex (Time Division Duplex, TDD) system, a Universal Mobile Telecommunication System (Universal Mobile Telecommunication System, UMTS), and a Worldwide Interoperability for Microwave Access (Worldwide Interoperability for Microwave Access, WiMAX) communications system.

It should also be understood that in the embodiments of the present invention, user equipment (User Equipment, UE) maybe referred to as a terminal (Terminal), a mobile station (Mobile Station, MS), a mobile terminal (Mobile Terminal), and the like. The user equipment may communicate with one or more core networks by using a radio access network (Radio Access Network, RAN). For example, the user equipment may be a mobile phone (also referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

It should further be understood that in the embodiments of the present invention, a base station may be a base station (Base Transceiver Station, BTS) in the GSM or CDMA, or may be a base station (NodeB) in the WCDMA, or may be an evolved NodeB (evolved Node B, eNB or e-NodeB) in the LTE, which is not limited in the present invention.

Figure 1:
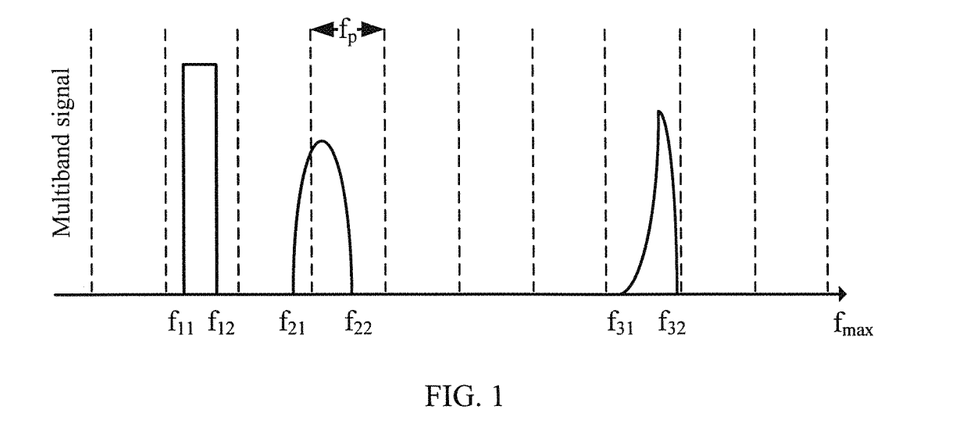
FIG. 1 is an exemplary schematic diagram of a frequency spectrum of a to-be-processed multiband signal.

FIG. 1 shows an example of a frequency spectrum of a to-be-processed multiband signal. A system frequency band is divided into N sub-bands on a basis of $f_p$, and a central frequency of each sub-band is n $f_p$, where n=1, 2, . . . , N, $f_p=1/T$, and T is a period of a multi-tone local oscillator signal. In the example shown in FIG. 1, N=10, and in the system frequency band, the multiband signal has only three non-zero spectral components, and frequency spectrum locations in which the three non-zero spectral components are located are respectively $f_{11}$ to $f_{12}$, $f_{21}$ to $f_{22}$, and $f_{31}$ to $f_{32}$. The three non-zero spectral components are distributed in four sub-bands of the system frequency band, that is, wanted signals exist only on four sub-bands in ten sub-bands, and no wanted signal exists on other six sub-bands.

Figure 2:
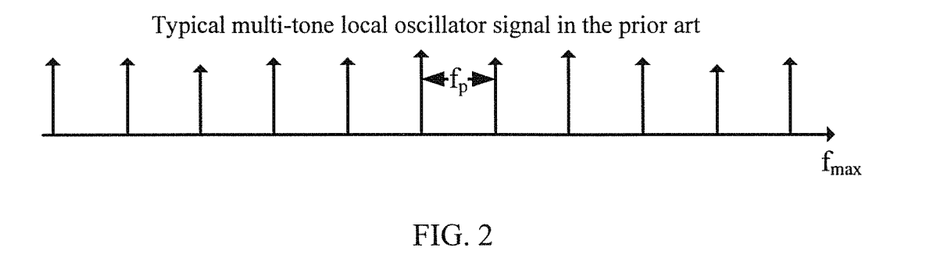
FIG. 2 is an exemplary schematic diagram of a frequency spectrum of a typical multi-tone local oscillator signal in a compressed sensing technology.

In the embodiments of the present invention, the multi-tone local oscillator signal may refer to a signal including multiple frequency spectrum pulses, and the multi-tone local oscillator signal includes multiple harmonics in a frequency domain. FIG. 2 shows an example of a frequency spectrum of a typical multi-tone local oscillator signal in a compressed sensing technology. The multi-tone local oscillator signal uses T as a period, and includes an n-harmonic of a fundamental frequency $f_p$, where n=1, 2, . . . , N. That is, in all sub-bands of the system frequency band, the multi-tone local oscillator signal has a non-zero spectral component. In this case, if frequency mixing is performed on the multi-tone local oscillator signal and the multiband signal shown in FIG. 1 according to a solution in the prior art, spectral components that are of the multi-tone local oscillator signal and in the foregoing four sub-bands move non-zero components of the multiband signal that are corresponding to the spectral components to a baseband; at the same time, spectral components that are of the multi-tone local oscillator signal and in the other six sub-bands move an unwanted signal (that is, noise and/or an interfering signal) corresponding to the spectral components to the baseband, so that aliasing of the multiband signal and the unwanted signal is performed so as to reduce a signal-to-noise ratio of a signal.

The embodiments of the present invention provide a multiband signal processing apparatus and method. An optimized multi-tone local oscillator signal and a band-pass filter are used, so that relatively little noise is brought in when frequency mixing is performed on a multi-tone local oscillator signal and a to-be-processed multiband signal, so as to improve a signal-to-noise ratio of an obtained baseband signal.

Figure 3:
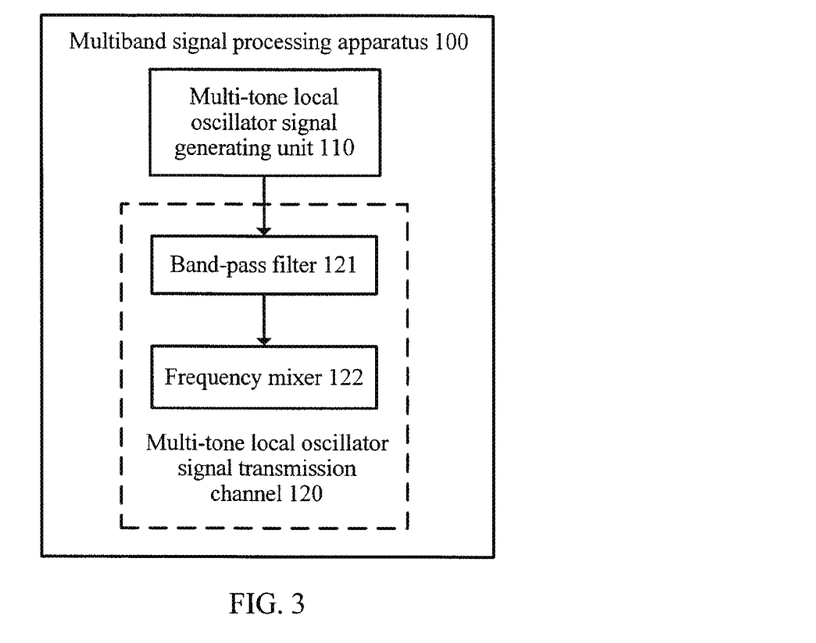
FIG. 3 is a schematic block diagram of a multiband signal processing apparatus according to an embodiment of the present invention.

FIG. 3 exemplarily shows a multiband signal processing apparatus 100 according to an embodiment of the present invention. The multiband signal processing apparatus 100 may be specifically a receiving device or a sending device in a communications system, such as a base station, UE, or a network unit, which is not limited in the embodiment of the present invention. As shown in FIG. 3, the apparatus 100 includes a multi-tone local oscillator signal generating unit 110 and a multi-tone local oscillator signal transmission channel 120, where the multi-tone local oscillator signal transmission channel 120 includes a band-pass filter 121 and a frequency mixer 122.

The multi-tone local oscillator signal generating unit 110 is configured to generate a multi-tone local oscillator signal according to frequency response information of at least one device included in the multi-tone local oscillator signal transmission channel 120, and transmit the multi-tone local oscillator signal to the band-pass filter 121 in the multi-tone local oscillator signal transmission channel 120.

The band-pass filter 121 is configured to filter the received multi-tone local oscillator signal that is generated by the multi-tone local oscillator signal generating unit 110, to obtain a filtered multi-tone local oscillator signal; and transmit the filtered multi-tone local oscillator signal to the frequency mixer 122.

The frequency mixer 122 is configured to perform frequency mixing on the multiband signal and the received multi-tone local oscillator signal that is filtered by the band-pass filter 121, where in at least one multiplied frequency of multiple contiguous multiplied frequencies of a fundamental frequency, the multi-tone local oscillator signal received by the frequency mixer 122 has no non-zero spectral component, and in a location in which a non-zero spectral component of the multiband signal is located, the multi-tone local oscillator signal received by the frequency mixer 122 has a non-zero spectral component.

The multi-tone local oscillator signal may be specifically a periodic sequence, and preferably, may be expressed by using a least significant bit number.

The multi-tone local oscillator signal generating unit 110 generates the multi-tone local oscillator signal according to the frequency response information of one or more devices included in the multi-tone local oscillator signal transmission channel 120, that is, in a process of generating the multi-tone local oscillator signal, impact of the at least one device on an amplitude and/or a phase of a local oscillator signal is taken into consideration, so that the generated local oscillator signal can meet a frequency mixing requirement better; then, the multi-tone local oscillator signal generating unit 110 transmits the generated multi-tone local oscillator signal to the band-pass filter 121 in the multi-tone local oscillator signal transmission channel 120. The band-pass filter 121 receives the multi-tone local oscillator signal transmitted by the multi-tone local oscillator signal generating unit 110, filters, according to a preset filtering pass band condition, the multi-tone local oscillator signal received by the band-pass filter 121, and transmits a filtered multi-tone local oscillator signal to a frequency mixer 122 in the multi-tone local oscillator signal transmission channel 120. The frequency mixer 122 receives the filtered multi-tone local oscillator signal that is transmitted by the band-pass filter 121, and performs frequency mixing on the received filtered multi-tone local oscillator signal and a to-be-processed multiband signal to obtain a baseband signal.

The multi-tone local oscillator signal received by the frequency mixer 122 may have a non-zero spectral component in a location corresponding to the multiband signal, or the multi-tone local oscillator signal received by the frequency mixer 122 may have a non-zero spectral component around the corresponding location, which is not limited in the embodiment of the present invention. In this way, in one or more multiplied frequencies in N multiplied frequencies of $f_p$, the multi-tone local oscillator signal received by the frequency mixer 122 has no non-zero spectral component. Therefore, in a process of frequency mixing, the multi-tone local oscillator signal performs aliasing of relatively little noise on a baseband, so as to improve a signal-to-noise ratio of the baseband signal.

Therefore, according to the multiband signal processing apparatus in the embodiment of the present invention, a multi-tone local oscillator signal generating unit generates a multi-tone local oscillator signal according to frequency response information of at least one device included in a multi-tone local oscillator signal transmission channel, and transmits the generated multi-tone local oscillator signal to the multi-tone local oscillator signal transmission channel. A band-pass filter in the multi-tone local oscillator signal transmission channel filters the multi-tone local oscillator signal received by the band-pass filter according to a preset filtering pass band, and transmits a filtered multi-tone local oscillator signal to a frequency mixer in the multi-tone local oscillator signal transmission channel. The frequency mixer performs frequency mixing on a to-be-processed multiband signal and the received multi-tone local oscillator signal that is filtered by the band-pass filter, so as to obtain a baseband signal, where in at least one multiplied frequency of multiple contiguous multiplied frequencies of a fundamental frequency, the multi-tone local oscillator signal received by the frequency mixer has no non-zero spectral component, which can avoid, in a process of frequency mixing, performing aliasing of too much noise and the multiband signal on a baseband so as to improve a signal-to-noise ratio of the baseband signal.

In the embodiment of the present invention, the multi-tone local oscillator signal received by the frequency mixer 122 may have one non-zero spectral component; or have multiple non-zero spectral components and a quantity of the multiple non-zero spectral components is less than N. The multi-tone local oscillator signal received by the frequency mixer 122 may have a non-zero spectral component in at least one preset area. Each preset area of the at least one preset area includes a location in which a non-zero spectral component of the multiband signal is located, that is, a non-zero spectral component of the multiband signal may be located in one preset area of the at least one preset area. Optionally, a quantity of the at least one preset area may equal a quantity of non-zero spectral components of the multiband signal. In an example of FIG. 1, the multiband signal has three non-zero spectral components, and correspondingly, the quantity of the at least one preset area may be 3. In this case, each preset area of the at least one preset area may use, as a start point, a central frequency of a non-zero spectral component that is located in each preset area, to extend a specified length towards two sides; or each preset area separately uses, as start points, a minimum frequency and a maximum frequency that are corresponding to a non-zero spectral component located in each preset area, to extend a specified length towards two sides. The extended length may be equal to a sampling frequency in a subsequent process, which is not limited in the embodiment of the present invention. Optionally, in another embodiment, a quantity of the at least one preset area may also equal a quantity of sub-bands occupied by a non-zero spectral component of the multiband signal. In an example of FIG. 1, the multiband signal has a non-zero spectral component in four sub-bands, and correspondingly, the quantity of the at least one preset area may be 4. In this case, each preset area of the at least one preset area may separately use, as start points, a minimum frequency and a maximum frequency that are corresponding to a non-zero spectral component located in each preset area, to extend a specified length towards two sides, or may coincide with a sub-band area in which a non-zero spectral component located in each preset area is located, which is not limited in the embodiment of the present invention.

The multi-tone local oscillator signal generating unit 110 may be specifically a processor. The multi-tone local oscillator signal generating unit 110 generates the multi-tone local oscillator signal according to the frequency response information of the at least one device included in the multi-tone local oscillator signal transmission channel 120. Frequency response information of a device is used to indicate a frequency response feature of the device; the frequency response feature may indicate, when an input signal input into the device is output, a change of the input signal in an amplitude and/or a phase, and describe a capability of the device to process signals in different frequencies. The multi-tone local oscillator signal generating unit 110 may generate the multi-tone local oscillator signal mainly based on the frequency response information of one or more devices in the multi-tone local oscillator signal transmission channel 120. For example, the multi-tone local oscillator signal generating unit 110 mainly uses frequency response information of the band-pass filter 121 as a basis. Alternatively, because all devices included in the multi-tone local oscillator signal transmission channel 120 may affect a phase and/or an amplitude of the multi-tone local oscillator signal, the multi-tone local oscillator signal generating unit 110 may also generate the multi-tone local oscillator signal based on frequency response information of all the devices included in the multi-tone local oscillator signal transmission channel 120. In this way, when reaching the frequency mixer 122, the local oscillator signal can meet a frequency mixing requirement better. However, the embodiment of the present invention imposes no limitation thereto.

Specifically, the multi-tone local oscillator signal generating unit 110 may use a preset algorithm, such as a genetic algorithm, use the foregoing frequency response information of the at least one device as an input parameter, select an optimal random sequence from multiple optional random sequences, and use the optimal random sequence as the multi-tone local oscillator signal. The optimal random sequence may be expressed by using a least significant bit number. For example, the optimal random sequence is a square wave whose value is ±1, or the like. The optimal random sequence enables the generated multi-tone local oscillator signal to have only several non-zero harmonics after the generated multi-tone local oscillator signal reaches the frequency mixer 122; that is, the generated multi-tone local oscillator signal has a non-zero spectral component only in one or more frequency spectrum locations, and a distribution of the non-zero spectral component meets a specific requirement. For example, the multi-tone local oscillator signal received by the frequency mixer 122 has a non-zero spectral component only in a location in which a non-zero spectral component of the multiband signal is located, or the received multi-tone local oscillator signal has a non-zero spectral component only around and in a location in which a non-zero spectral component of the multiband signal is located, or all non-zero spectral components of the multi-tone local oscillator signal received by the frequency mixer 122 have close amplitudes, which is not limited in the embodiment of the present invention.

The multi-tone local oscillator signal transmission channel 120 may refer to a transmission channel that is used to transmit a multi-tone local oscillator signal between the multi-tone local oscillator signal generating unit 110 and the frequency mixer 122. The multi-tone local oscillator signal transmission channel 120 may include all devices that are passed by a multi-tone local oscillator signal in a process of reaching the frequency mixer 122 from the multi-tone local oscillator signal generating unit 110. The multi-tone local oscillator signal transmission channel 120 may include the band-pass filter 121 and the frequency mixer 122, or may further include another device, which is not limited in the embodiment of the present invention.

Optionally, distances between a location in which any non-zero spectral component of the multi-tone local oscillator signal received by the frequency mixer 122 is located and locations in which one or more non-zero spectral components of the multiband signal are located are less than a first threshold.

In other words, the multi-tone local oscillator signal received by the frequency mixer 122 has no non-zero spectral component in a first location, where distances between the first location and locations in which all non-zero spectral components of the multiband signal are located are all greater than the first threshold.

The first threshold may be preset according to an actual requirement, for example, be set according to a requirement for a signal-to-noise ratio, which is not limited in the embodiment of the present invention. A non-zero spectral component of the multi-tone local oscillator signal received by the frequency mixer 122 is distributed around a non-zero spectral component of the multiband signal, so as to reduce bringing in of noise as much as possible and further improve a signal-to-noise ratio of a baseband signal. For example, the multi-tone local oscillator signal received by the frequency mixer 122 has a non-zero spectral component only in a location in which the non-zero spectral component of the multiband signal is located, or the multi-tone local oscillator signal received by the frequency mixer 122 has a non-zero spectral component only around and in a location in which the non-zero spectral component of the multiband signal is located, which is not limited in the embodiment of the present invention.

Optionally, in another embodiment, to implement a full column rank of a measurement matrix in a subsequent process of sampling the baseband signal, phases of multiple non-zero spectral components of the multi-tone local oscillator signal received by the frequency mixer 122 have no linear or nonlinear relevance, and the multiple non-zero spectral components have close amplitudes. The measurement matrix is determined by a location in which the to-be-processed multiband signal is located and a location in which a non-zero spectral component of the multi-tone local oscillator signal is located.

Correspondingly, the multi-tone local oscillator signal generating unit 110 is specifically configured to generate the multi-tone local oscillator signal according to the frequency response information of the at least one device included in the multi-tone local oscillator signal transmission channel 120, so that the multi-tone local oscillator signal received by the frequency mixer 122 has multiple non-zero spectral components and the multiple non-zero spectral components meet at least one of the following conditions: phases of the multiple non-zero spectral components are irrelevant, or a signal amplitude difference between any two spectral components of the multiple non-zero spectral components does not exceed a second threshold.

It should be understood that both the phase and the amplitude herein refer to a phase and an amplitude that are of the multi-tone local oscillator signal in a frequency domain. That the phases of the multiple spectral components are irrelevant may mean that the phases of the multiple spectral components have no linear or nonlinear relevance. For example, the phases are distributed randomly, the phases are not equal, or the phases are not an arithmetic progression or a geometric progression, or the like, which is not limited in the embodiment of the present invention. In addition, the signal amplitude difference between any two non-zero spectral components does not exceed the preset threshold, so that the multi-tone local oscillator signal does not cause too much attenuation or enhancement on a non-zero spectral component of the multiband signal, thereby reducing a signal-to-noise ratio of a baseband signal. The second threshold may be configured according to an actual requirement, such as a requirement for a signal-to-noise ratio, performance of all devices included in the apparatus, which is not limited in the embodiment of the present invention.

If the multi-tone local oscillator signal has a non-zero spectral component only in a location in which the non-zero spectral component of the multiband signal is located, so that the measurement matrix that is determined according to the multi-tone local oscillator signal and the to-be-processed multiband signal meets the full column rank, the multi-tone local oscillator signal may have a non-zero spectral component only in the location in which the non-zero spectral component of the multiband signal is located. On the contrary, the multi-tone local oscillator signal may have a non-zero spectral component only around and in a location in which the non-zero spectral component of the multiband signal is located, so as to implement the full column rank of the matrix. A quantity of non-zero spectral components that are of the multi-tone local oscillator signal and around the multi-tone local oscillator signal should be as less as possible, so as to reduce bringing in of noise, which is not limited in the embodiment of the present invention.

Figure 4:
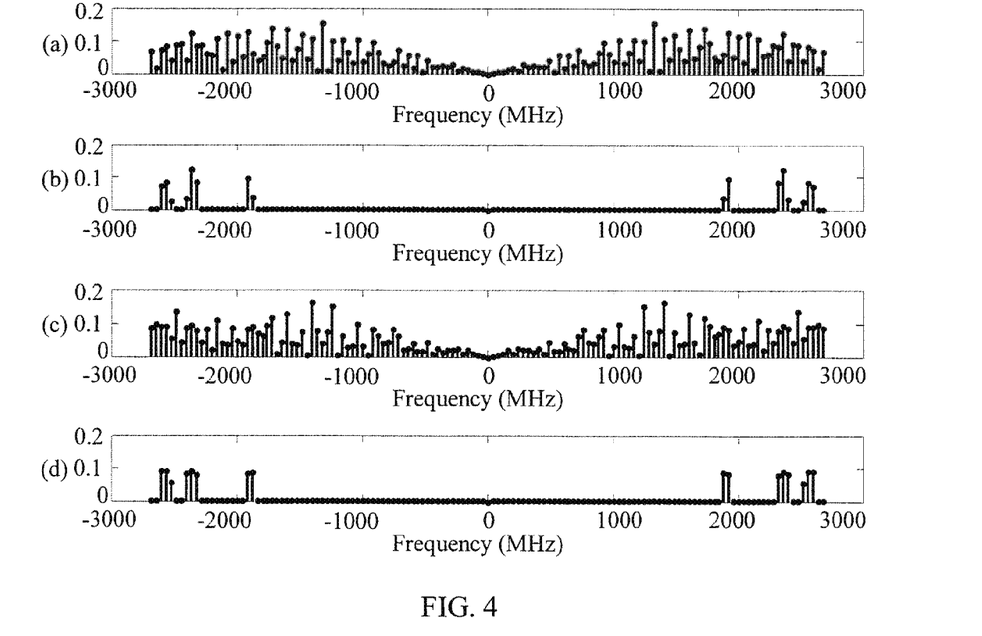
FIG. 4 is a schematic diagram of a frequency spectrum of a multi-tone local oscillator signal according to an embodiment of the present invention.

FIG. 4 shows a frequency spectrum of a multi-tone local oscillator signal in various conditions according to an embodiment of the present invention. FIG. 4(a) shows an example of the multi-tone local oscillator signal generated by the multi-tone local oscillator signal generating unit 110, where the multi-tone local oscillator signal generating unit 110 uses a random sequence as the multi-tone local oscillator signal. FIG. 4(b) shows the multi-tone local oscillator signal that is filtered by the band-pass filter 122 and corresponding to the multi-tone local oscillator signal shown in FIG. 4(a), where the multi-tone local oscillator signal has multiple non-zero spectral components in a 2000 to 3000 MHz frequency band, and amplitudes of the multiple non-zero spectral components have a relatively great difference. In this case, a baseband signal obtained from the multi-tone local oscillator signal has a relatively low signal-to-noise ratio. FIG. 4(c) shows another example of the multi-tone local oscillator signal generated by the multi-tone local oscillator signal generating unit 110. When generating the multi-tone local oscillator signal, the multi-tone local oscillator signal generating unit 110 selects an optimal random sequence according to a signal amplitude condition, and uses the optimal random sequence as the multi-tone local oscillator signal. Correspondingly, FIG. 4(d) shows the multi-tone local oscillator signal that is filtered by the band-pass filter and corresponding to the multi-tone local oscillator signal shown in FIG. 4(c), where the multi-tone local oscillator signal has multiple non-zero spectral components in the 2000 to 3000 MHz frequency band, and amplitudes of the multiple non-zero spectral components are basically the same. In this case, a baseband signal obtained from the multi-tone local oscillator signal has a relatively high signal-to-noise ratio.

In the embodiment of the present invention, the band-pass filter 121 may have one or more filtering pass bands, and the one or more filtering pass bands may correspond to the non-zero spectral component of the multiband signal. In this case, bandwidth configuration of the one or more filtering pass bands may meet that the one or more filtering pass bands have as narrow as possible bandwidth based on reserve of a needed harmonic, so as to avoid mixing noise into a multiband signal during frequency mixing, where the needed harmonic includes a harmonic corresponding to the non-zero spectral component of the multiband signal.

As an optional embodiment, the band-pass filter 121 may be a tunable band-pass filter.

In this way, a filtering pass band of the band-pass filter 121 may be configured according to an actual requirement. For example, the filtering pass band of the band-pass filter 121 may be configured according to a frequency spectrum distribution situation of a to-be-processed multiband signal, so that the multiband signal processing apparatus 100 may be applicable to various multiband signal scenarios. For example, a quantity of filtering pass bands configured for the band-pass filter 121 may equal a quantity of at least one non-zero spectral component of the multiband signal, and bandwidth of each configured filtering pass band is equal to or slightly greater than bandwidth of the non-zero spectral component corresponding to the multiband signal in the multiband signal, which is not limited in the embodiment of the present invention.

In this case, optionally, when generating the multi-tone local oscillator signal, the multi-tone local oscillator signal generating unit 110 may only consider the frequency response information of the one or more devices in the multi-tone local oscillator signal transmission channel 120, and does not consider frequency spectrum distribution information of the multiband signal. That is, if the frequency response information of the at least one device in the multi-tone local oscillator signal transmission channel 120 remains unchanged, the multi-tone local oscillator signal generating unit 110 generates a same multi-tone local oscillator signal. Therefore, in an optional embodiment, the multi-tone local oscillator signal generated by the multi-tone local oscillator signal generating unit 110 may be stored in a memory. Each time the multiband signal needs to be processed, the multi-tone local oscillator signal may be obtained from the memory, and the multi-tone local oscillator signal generating unit 110 does not need to generate a multi-tone local oscillator signal every time, so that a system resource is saved and processing efficiency is improved. If frequency response information of a device in the at least one device changes, the multi-tone local oscillator signal generating unit 110 may generate a new multi-tone local oscillator signal according to changed frequency response information, and update the multi-tone local oscillator signal stored in the memory, which is not limited in the embodiment of the present invention.

Figure 5:
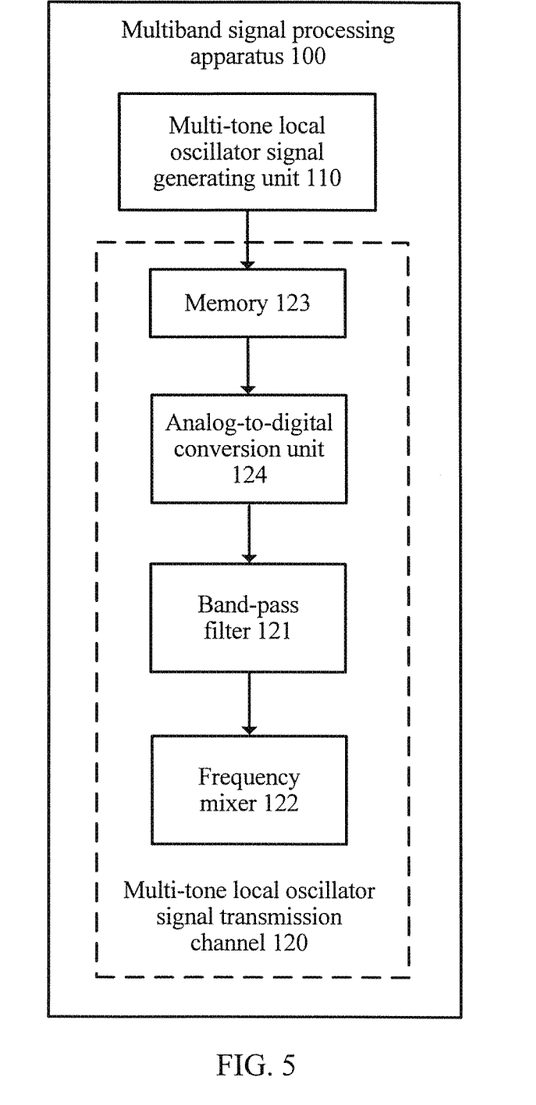
FIG. 5 is another schematic block diagram of a multiband signal processing apparatus according to an embodiment of the present invention.

As shown in FIG. 5, the multi-tone local oscillator signal transmission channel 120 further includes a memory 123 and an analog-to-digital conversion unit 124.

The multi-tone local oscillator signal generating unit 110 is specifically configured to transmit the generated multi-tone local oscillator signal to the memory 123 in the multi-tone local oscillator signal transmission channel 120.

The memory 123 is configured to store, in a digital form, the multi-tone local oscillator signal generated by the multi-tone local oscillator signal generating unit 110.

The analog-to-digital conversion unit 124 is configured to obtain the multi-tone local oscillator signal stored in the memory 123, convert the obtained multi-tone local oscillator signal in the digital faint into a multi-tone local oscillator signal in an analog form, and transmit the multi-tone local oscillator signal in the analog form to the band-pass filter 121.

The band-pass filter 121 is specifically configured to filter the received multi-tone local oscillator signal in the analog form to obtain a filtered multi-tone local oscillator signal.

The memory 123 may be specifically a random access memory (Random Access Memory, RAM). The memory 123 stores, in a form of a digital signal, the multi-tone local oscillator signal received by the memory 123, and the analog-to-digital conversion unit 124 is configured to convert the received multi-tone local oscillator signal from the form of a digital signal into a form of an analog signal. Optionally, the analog-to-digital conversion unit 124 may be specifically an analog-to-digital converter, or the analog-to-digital conversion unit 124 may first perform parallel-to-serial conversion processing on the obtained multi-tone local oscillator signal that is stored in the memory 123, and then perform digital-to-analog conversion processing on a multi-tone local oscillator signal in a serial form that is obtained after conversion. Optionally, in another embodiment, the multi-tone local oscillator signal transmission channel 120 may further include a parallel-to-serial converter. The parallel-to-serial converter is separately connected to the memory 123 and the analog-to-digital conversion unit 124, and is configured to obtain the stored multi-tone local oscillator signal from the memory 123, convert the obtained multi-tone local oscillator signal from a form of a parallel signal into a form of a serial signal, and transmit the multi-tone local oscillator signal in the form of a serial signal to the analog-to-digital conversion unit 124. The embodiment of the present invention imposes no limitation thereto.

Optionally, in another embodiment, the band-pass filter 121 may also have a relatively wide filtering pass band, so that the band-pass filter 121 may be applicable to various multiband signal scenarios. For example, the filtering pass band of the band-pass filter 121 may be a frequency band that can be used by a system, or the filtering pass band of the band-pass filter 121 may be a frequency band that is configured by the system for the multiband signal processing apparatus, which is not limited in the embodiment of the present invention. In this case, optionally, the multi-tone local oscillator signal generating unit 110 may generate a multi-tone local oscillator signal based on the non-zero spectral component of the multiband signal, as the multi-tone local oscillator signal generating unit 110 considers the frequency response information of the one or more devices in the multi-tone local oscillator signal transmission channel 120. In this way, for different multiband signals, the multi-tone local oscillator signal generating unit 110 may generate different multi-tone local oscillator signals, so as to enable the generated multi-tone local oscillator signals better match the to-be-processed multiband signal and further improve a signal-to-noise ratio of a baseband signal.

Optionally, in another embodiment, the multi-tone local oscillator signal transmission channel 120 further includes an equalizer.

The band-pass filter 121 is specifically configured to transmit the filtered multi-tone local oscillator signal to the equalizer.

The equalizer is configured to adjust, according to a preset adjustment criterion, a signal amplitude of the received multi-tone local oscillator signal that is filtered by the band-pass filter 121, to obtain a multi-tone local oscillator signal whose signal amplitude is adjusted; and transmit the multi-tone local oscillator signal whose signal amplitude is adjusted to the frequency mixer 122.

The frequency mixer 122 is specifically configured to perform frequency mixing on the multiband signal and the received multi-tone local oscillator signal whose signal amplitude is adjusted.

Figure 6:
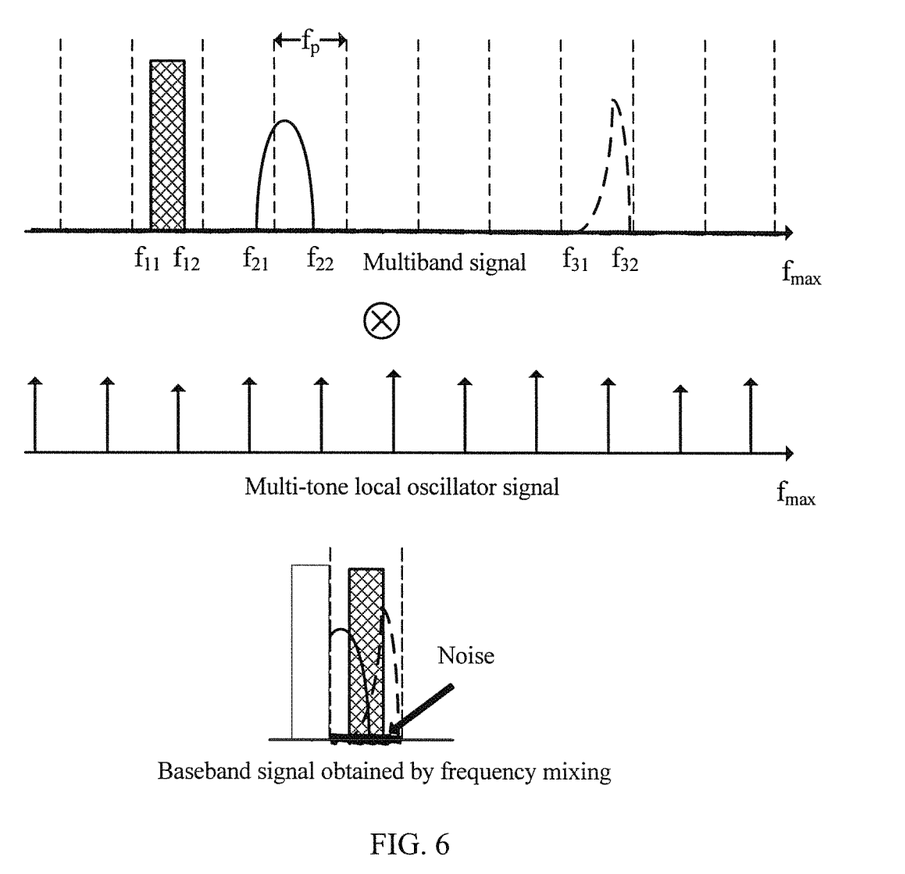
FIG. 6 is a schematic diagram of performing frequency mixing on a multi-tone local oscillator signal and a multiband signal in the prior art.
Figure 7:
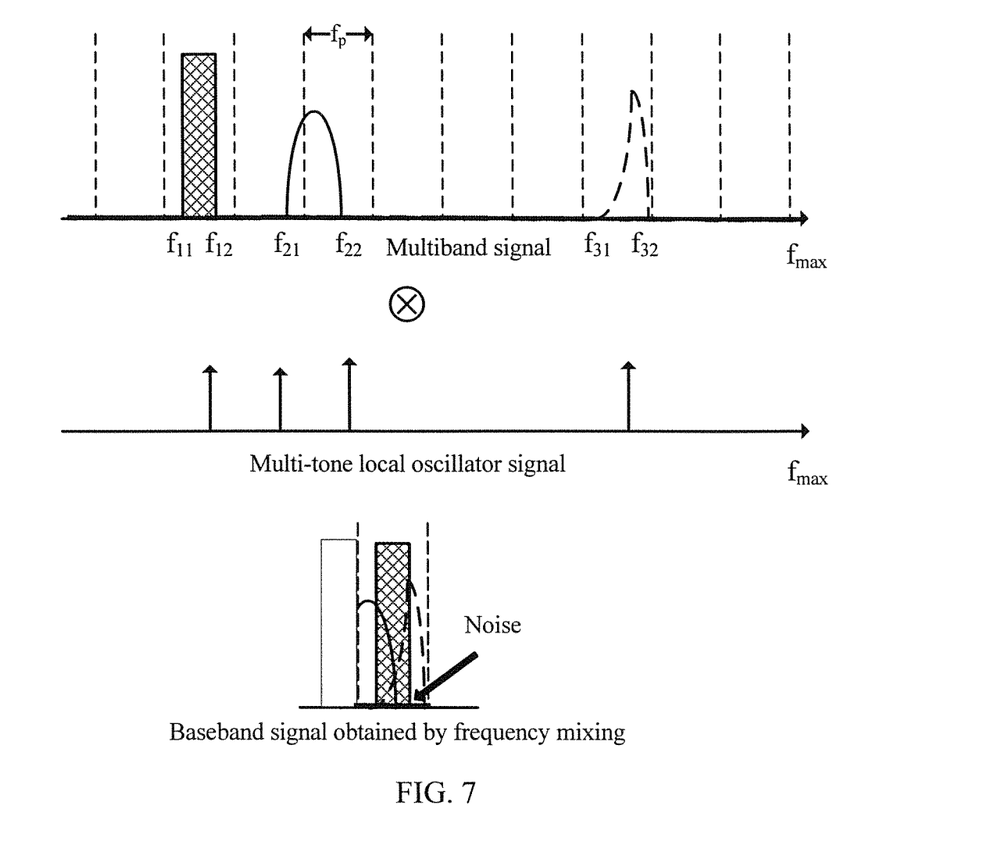
FIG. 7 is a schematic diagram of performing frequency mixing on a multi-tone local oscillator signal and a multiband signal according to an embodiment of the present invention.

FIG. 6 is a schematic diagram of performing frequency mixing on a multi-tone local oscillator signal and a multi-band signal in the prior art. As shown in FIG. 6, for a multi-tone local oscillator signal in the prior art, there is a non-zero harmonic in all multiplied frequencies of a fundamental frequency, that is, there is a non-zero spectral component in all multiplied frequencies of the fundamental frequency. Correspondingly, a baseband signal obtained after frequency mixing is performed on the multi-tone local oscillator signal and the multiband signal has relatively much noise, and a signal-to-noise ratio of the baseband signal is relatively low. FIG. 7 is a schematic diagram of performing frequency mixing on a multiband signal and the multi-tone local oscillator signal received by the frequency mixer 122 in the embodiment of the present invention. As shown in FIG. 7, a multi-tone local oscillator signal (that is, the multi-tone local oscillator signal received by the frequency mixer) in the embodiment of the present invention has a non-zero spectral component only in a location in which the non-zero spectral component of the multiband signal is located. Correspondingly, a baseband signal obtained after frequency mixing is performed on the multi-tone local oscillator signal and the multiband signal has relatively little noise, and a signal-to-noise ratio of the baseband signal is relatively high.

Therefore, according to the multiband signal processing apparatus in the embodiment of the present invention, a multi-tone local oscillator signal generating unit generates a multi-tone local oscillator signal according to frequency response information of at least one device included in a multi-tone local oscillator signal transmission channel, and transmits the generated multi-tone local oscillator signal to the multi-tone local oscillator signal transmission channel. A band-pass filter in the multi-tone local oscillator signal transmission channel filters the multi-tone local oscillator signal received by the band-pass filter according to a preset filtering pass band, and transmits a filtered multi-tone local oscillator signal to a frequency mixer in the multi-tone local oscillator signal transmission channel. The frequency mixer performs frequency mixing on a to-be-processed multiband signal and the received multi-tone local oscillator signal that is filtered by the band-pass filter, so as to obtain a baseband signal, where in at least one multiplied frequency of multiple contiguous multiplied frequencies of a fundamental frequency, the multi-tone local oscillator signal received by the frequency mixer has no non-zero spectral component, which can avoid, in a process of frequency mixing, performing aliasing of too much noise and the multiband signal on a baseband so as to improve a signal-to-noise ratio of the baseband signal.

The foregoing describes in detail the multiband signal processing apparatus according to the embodiment of the present invention with reference to FIG. 3 to FIG. 7. The following describes a multiband signal processing method according to an embodiment of the present invention with reference to FIG. 8.

Figure 8:
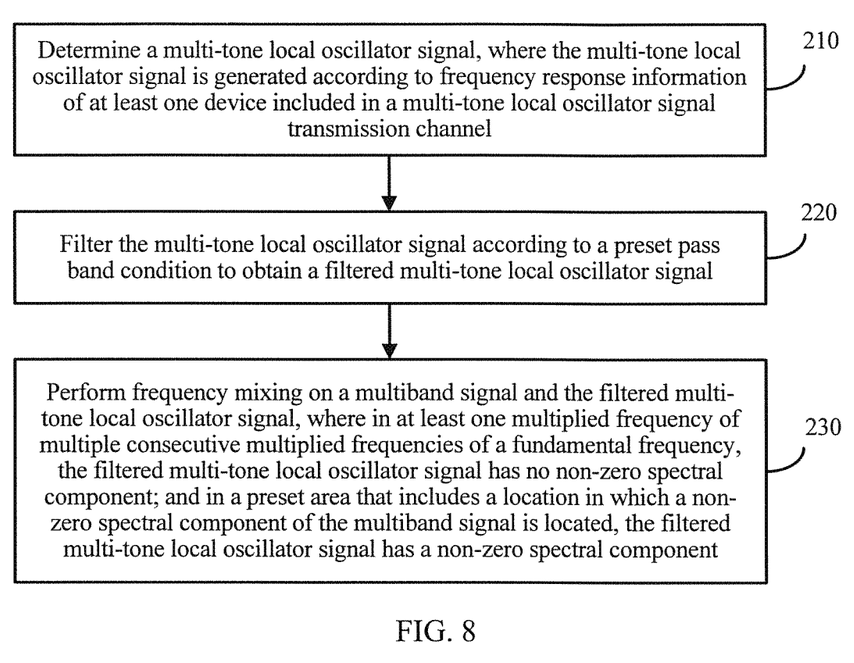
FIG. 8 is a schematic flowchart of a multiband signal processing method according to an embodiment of the present invention.

FIG. 8 shows a schematic flowchart of a multiband signal processing method 200 according to an embodiment of the present invention. The method may be executed by the multiband signal processing apparatus shown in FIG. 3 to FIG. 7, and the multiband signal processing apparatus includes a multi-tone local oscillator transmission channel. The method 200 includes the following steps:

S210. Determine a multi-tone local oscillator signal, where the multi-tone local oscillator signal is generated according to frequency response information of at least one device included in the multi-tone local oscillator signal transmission channel.

S220. Filter the multi-tone local oscillator signal according to a preset pass band condition to obtain a filtered multi-tone local oscillator signal.

S230. Perform frequency mixing on the multiband signal and the filtered multi-tone local oscillator signal, where in at least one multiplied frequency of multiple contiguous multiplied frequencies of a fundamental frequency, the filtered multi-tone local oscillator signal has no non-zero spectral component; and in a preset area that includes a location in which a non-zero spectral component of the multiband signal is located, the filtered multi-tone local oscillator signal has a non-zero spectral component.

Therefore, according to the multiband signal processing method in the embodiment of the present invention, a multi-tone local oscillator signal is generated according to frequency response information of at least one device included in a multi-tone local oscillator signal transmission channel; the multi-tone local oscillator signal is filtered according to a preset filtering pass band condition; and frequency mixing is performed on a filtered multi-tone local oscillator signal and a to-be-processed multiband signal, so as to obtain a baseband signal. In at least one multiplied frequency of multiple contiguous multiplied frequencies of a fundamental frequency, the filtered multi-tone local oscillator signal has no non-zero spectral component, which can avoid, in a process of frequency mixing, performing aliasing of too much noise and the multiband signal on a baseband, thereby improving a signal-to-noise ratio of the baseband signal.

Optionally, the filtered multi-tone local oscillator signal has no non-zero spectral component in a first location, where distances between the first location and locations in which all non-zero spectral components of the multiband signal are located are all greater than a first threshold.

Optionally, in another embodiment, the filtered multi-tone local oscillator signal has multiple non-zero spectral components, where the multiple non-zero spectral components meet at least one of the following conditions: phases of the multiple non-zero spectral components are irrelevant, or a signal amplitude difference between any two spectral components of the multiple non-zero spectral components does not exceed a second threshold.

Optionally, in another embodiment, S210 of determining a multi-tone local oscillator signal includes: obtaining a multi-tone local oscillator signal stored in a memory;

in this case, before S220, the method 200 may further include:

converting the obtained multi-tone local oscillator signal from a digital form into an analog form; and correspondingly, S220 of filtering the multi-tone local oscillator signal in the analog form according to a preset pass band condition to obtain a filtered multi-tone local oscillator signal includes:

filtering the multi-tone local oscillator signal in the analog form according to the preset pass band condition to obtain the filtered multi-tone local oscillator signal.

Optionally, in another embodiment, S210 of determining a multi-tone local oscillator signal includes:

generating the multi-tone local oscillator signal according to the frequency response information of the at least one device included in the multi-tone local oscillator signal transmission channel.

Optionally, in another embodiment, before S230, the method 200 further includes:

adjusting, according to a preset adjustment criterion, a signal amplitude of the filtered multi-tone local oscillator signal to obtain a multi-tone local oscillator signal whose signal amplitude is adjusted; and correspondingly, S230 of performing frequency mixing on the multiband signal and the filtered multi-tone local oscillator signal includes:

performing frequency mixing on the multiband signal and the multi-tone local oscillator signal whose signal amplitude is adjusted.

Therefore, according to the multiband signal processing method in the embodiment of the present invention, a multi-tone local oscillator signal is generated according to frequency response information of at least one device included in a multi-tone local oscillator signal transmission channel; the multi-tone local oscillator signal is filtered according to a preset filtering pass band condition; and frequency mixing is performed on a filtered multi-tone local oscillator signal and a to-be-processed multiband signal, so as to obtain a baseband signal. In at least one multiplied frequency of multiple contiguous multiplied frequencies of a fundamental frequency, the filtered multi-tone local oscillator signal has no non-zero spectral component, which can avoid, in a process of frequency mixing, performing aliasing of too much noise and the multiband signal on a baseband, thereby improving a signal-to-noise ratio of the baseband signal.

It should be understood that sequence numbers of the foregoing processes do not mean execution sequences. Execution sequences of the processes should be determined according to functions and internal logic of the processes, and shall not set any limitation on implementation processes of the embodiments of the present invention.

The multiband signal processing method 200 according to the embodiment of the present invention may be executed by modules of the multiband signal processing apparatus 100 shown in FIG. 3 to FIG. 7, and all steps included in the multiband signal processing method 200 may be implemented by functions of the multiband signal processing apparatus 100. For a specific process, refer to the foregoing apparatus embodiment. For brevity, details are not repeatedly described herein.

It should be understood that, the term "and/or" in the embodiments of the present invention describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A multiband signal processing apparatus, comprising:
   a multi-tone local oscillator signal transmission channel comprising a band-pass filter and a frequency mixer;
   a multi-tone local oscillator signal generating unit configured to:
      generate a multi-tone local oscillator signal according to frequency response information of at least one device comprised in the multi-tone local oscillator signal transmission channel, and
      transmit the multi-tone local oscillator signal to the band-pass filter;
   wherein the band-pass filter is configured to receive and filter the generated multi-tone local oscillator signal to generate a filtered multi-tone local oscillator signal; and
   wherein the frequency mixer is configured to frequency mix a multiband signal and the multi-tone local oscillator signal, in a preset area that comprises a location in which a non-zero spectral component of the multiband signal is located, the multi-tone local oscillator signal has a non-zero spectral component, and in at least one multiplied frequency of multiple contiguous multiplied frequencies of a fundamental frequency, the multi-tone local oscillator signal has no non-zero spectral component.

2. The apparatus according to claim 1, wherein the multi-tone local oscillator signal has no non-zero spectral component in a first location, and wherein distances between the first location and locations in which all non-zero spectral components of the multiband signal are located are all greater than a first threshold.

3. The apparatus according to claim 1, wherein the multi-tone local oscillator signal generating unit is configured to:
   generate the multi-tone local oscillator signal according to the frequency response information of the at least one device comprised in the multi-tone local oscillator signal transmission channel, so that the multi-tone local oscillator signal has multiple non-zero spectral components which meet at least one of the following conditions: phases of the multiple non-zero spectral components are irrelevant, or a signal amplitude difference between any two spectral components of the multiple non-zero spectral components does not exceed a second threshold.

4. The apparatus according to claim 1, wherein the band-pass filter is a tunable band-pass filter.

5. The apparatus according to claim 1, wherein:
   the multi-tone local oscillator signal transmission channel further comprises, a memory and an analog-to-digital conversion unit;
   the multi-tone local oscillator signal generating unit is configured to transmit the generated multi-tone local oscillator signal to the memory;
   the memory is configured to store, in a digital form, the multi-tone local oscillator signal generated by the multi-tone local oscillator signal generating unit;
   the analog-to-digital conversion unit is configured to obtain the multi-tone local oscillator signal stored in the memory, convert the obtained multi-tone local oscillator signal in the digital form into a local oscillator signal in an analog form, and transmit the multi-tone local oscillator signal in the analog form to the band-pass filter; and the band-pass filter is configured to filter the received multi-tone local oscillator signal in the analog form to obtain a filtered multi-tone local oscillator signal.

6. The apparatus according to claim 1, wherein:
the multi-tone local oscillator signal transmission channel further comprises an equalizer;
the band-pass filter is configured to transmit the filtered multi-tone local oscillator signal to the equalizer;
the equalizer is configured to adjust, according to a preset adjustment criterion, a signal amplitude of the received multi-tone local oscillator signal that is filtered by the band-pass filter, to obtain a multi-tone local oscillator signal whose signal amplitude is adjusted; and transmit the multi-tone local oscillator signal whose signal amplitude is adjusted to the frequency mixer; and
the frequency mixer is configured to perform frequency mixing on the multiband signal and the received multi-tone local oscillator signal whose signal amplitude is adjusted.

7. A multiband signal processing method for use in a multiband signal processing apparatus having a multi-tone local oscillator transmission channel, the method comprising:
generating a multi-tone local oscillator signal according to frequency response information of at least one device comprised in the multi-tone local oscillator signal transmission channel;
filtering the multi-tone local oscillator signal according to a preset pass band condition to obtain a filtered multi-tone local oscillator signal; and
performing frequency mixing on a multiband signal and the filtered multi-tone local oscillator signal, wherein in a preset area that comprises a location in which a non-zero spectral component of the multiband signal is located, the filtered multi-tone local oscillator signal has a non-zero spectral component, and in at least one multiplied frequency of multiple contiguous multiplied frequencies of a fundamental frequency, the filtered multi-tone local oscillator signal has no non-zero spectral component.

8. The method according to claim 7, wherein the filtered multi-tone local oscillator signal has no non-zero spectral component in a first location, and distances between the first location and locations in which all non-zero spectral components of the multiband signal are located are all greater than a first threshold.

9. The method according to claim 7, wherein the filtered multi-tone local oscillator signal has multiple non-zero spectral components that meet at least one of the following conditions: phases of the multiple non-zero spectral components are irrelevant, or a signal amplitude difference between any two spectral components of the multiple non-zero spectral components does not exceed a second threshold.

10. The method according to claim 7, wherein:
generating a multi-tone local oscillator signal comprises:
obtaining a multi-tone local oscillator signal stored in a memory;
before filtering the multi-tone local oscillator signal according to a preset pass band condition to obtain a filtered multi-tone local oscillator signal, the method further comprises:
converting the obtained multi-tone local oscillator signal from a digital form into an analog form; and
filtering the multi-tone local oscillator signal in the analog form according to a preset pass band condition to obtain a filtered multi-tone local oscillator signal comprises:
filtering the multi-tone local oscillator signal in the analog form according to the preset pass band condition to obtain the filtered multi-tone local oscillator signal.

11. The method according to claim 7, wherein:
before performing frequency mixing on the multiband signal and the filtered multi-tone local oscillator signal, the method further comprises:
adjusting, according to a preset adjustment criterion, a signal amplitude of the filtered multi-tone local oscillator signal to obtain a multi-tone local oscillator signal whose signal amplitude is adjusted; and
performing frequency mixing on the multiband signal and the filtered multi-tone local oscillator signal comprises:
performing frequency mixing on the multiband signal and the multi-tone local oscillator signal whose signal amplitude is adjusted.

* * * * *